No. 858,440. PATENTED JULY 2, 1907.
F. H. CHAPMAN.
CUTTING TOOL.
APPLICATION FILED MAR. 23, 1906.
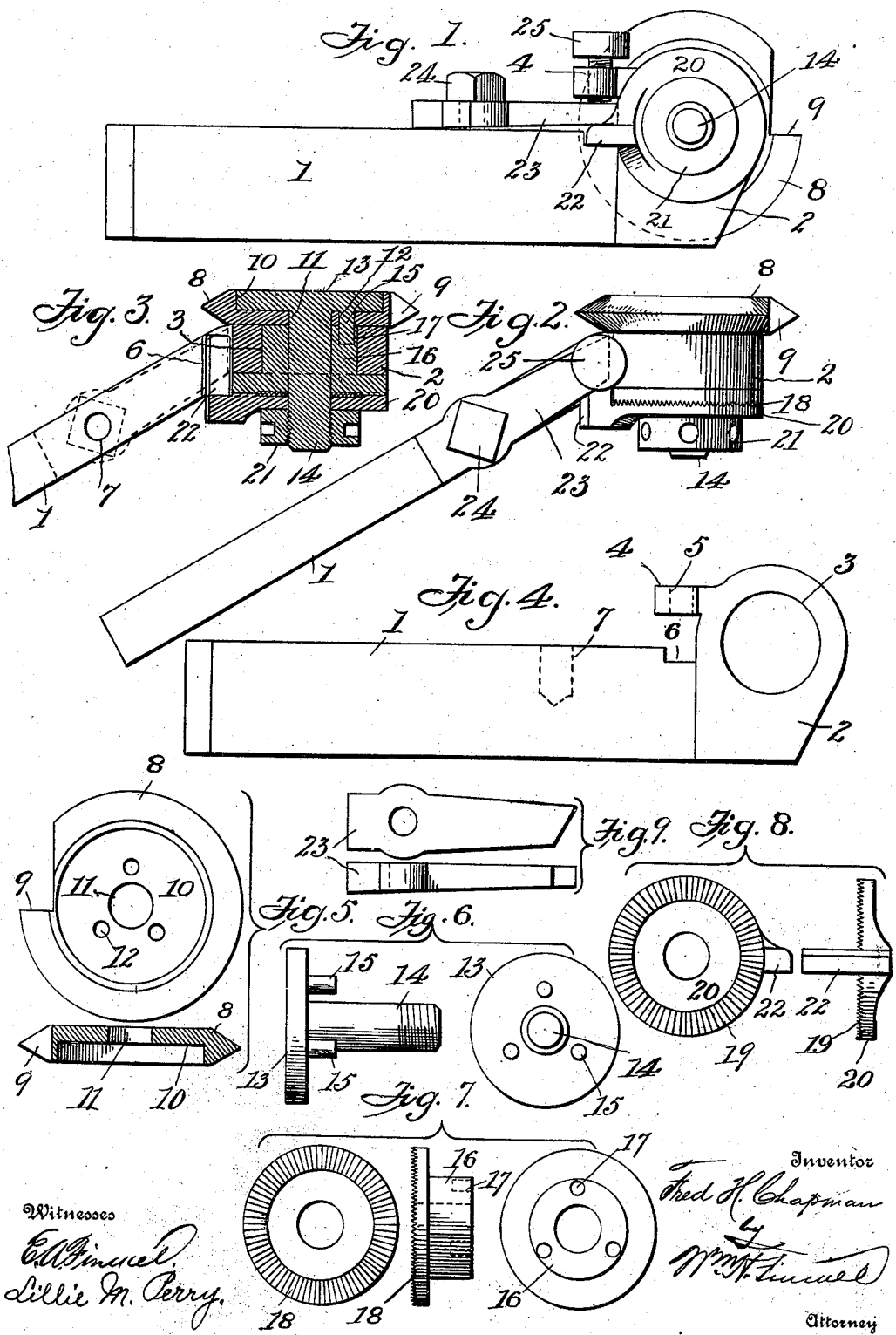

UNITED STATES PATENT OFFICE.

FRED H. CHAPMAN, OF GROTON, MASSACHUSETTS.

CUTTING-TOOL.

No. 858,440.          Specification of Letters Patent.          Patented July 2, 1907.

Application filed March 23, 1906. Serial No. 307,682.

*To all whom it may concern:*

Be it known that I, FRED H. CHAPMAN, a citizen of the United States, residing at Groton, in the county of Middlesex and State of Massachusetts, have invented a certain new and useful Improvement in Cutting-Tools, of which the following is a full, clear, and exact description.

The object of this invention is to provide a cutting tool for use in cutting screwthreads, or for forming or shaping, or for cutting off work, and in accordance with the character of the cutting implement in the tool, and in which provision is made for applying graduated tension to the tool for relieving the tool when it meets a considerable obstruction in the work, and for entirely cutting out such tension when not required, all as I will proceed now more particularly to set forth and finally claim.

I have herein shown and will describe my invention as embodied in a screwthread cutting tool, but wish to be understood as not limiting my invention to this single embodiment thereof.

In the accompanying drawings, illustrating my invention, in the several figures of which like parts are similarly designated, Figure 1 is a side elevation. Fig. 2 is a top plan view. Fig. 3 is a horizontal section, taken in part of the center so as to include pin 15 and holes 12 and 17. Fig. 4 is a side view of the tool holder. Fig. 5 shows the cutter in side view and cross-section. Fig. 6 shows the stud-bolt in side and rear view. Fig. 7 shows the female member of an adjusting clutch, in face, side and rear view. Fig. 8 shows the male member of the adjusting clutch, in face and side view. Fig. 9 shows a tension spring in plan view and side elevation.

1 is the holder, which may be of metal and adapted for use in any appropriate machine, and said holder, as indicated in Figs. 2 and 3, has an offset end 2 in which is an eye 3, and at the rear of the eye is a lug 4 provided with a screw-hole 5. Beneath this lug is a transverse groove 6 in the holder, and back of the transverse groove is a screw-hole 7.

The cutter 8 is of circular outline, with a V-edge notched at 9 to form a cutting edge, and this cutting edge may be renewed as often as desired within the extent of the perimeter of the cutter, by grinding it down transversely. This cutter has a recessed face at 10 and a central hole 11, and arranged around this central hole are other holes 12. The cutter is applied to the holder, as shown in Fig. 3, with its recessed portion outward and receiving the head 13 of the stud-bolt, (Fig. 6), the shank 14 of said stud-bolt extending through the hole 11, and the pins 15 on the back of the head 13 passing through the holes 12.

The female member 16 of the adjustable clutch, (see Fig. 7), has its hub portion inserted in the eye 3 of the offset portion of the holder, from the opposite side, and this hub is provided with sockets 17 into which the pins 15 of the stud-bolt enter. The head of the female member has a toothed face 18 which coöperates with the toothed face 19 of the male member 20 which is applied to it, and both the female member and the male member are perforated centrally so as to be slipped upon the shank 14 of the stud-bolt, and when thus arranged the stud-bolt, the cutter, and the female and male members are secured together in the eye 3 of the offset portion to the holder by a nut 21 screwed on the end of the shank 14, and the stud-bolt, the female and male members and the nut constitute a journal for the cutter and all are capable of being moved together within the eye 3 of the offset portion as a bearing or box.

By means of the toothed portions 18 and 19 of the female and male members above described, a very fine adjustment of the cutter may be made. This adjustment is fixed by means of a tail-piece 22 projecting rearwardly from the rim of the male member and entering the groove 6 in the tool holder, and coöperating with a plate-spring 23 secured to the tool holder in an adjustable manner by means of a screw 24, (hereinafter referred to as a "clamp-screw"), with its free end projecting over upon the top of the tail-piece 22. The plate-spring 23 is beveled from end to end on its underside, as shown in Fig. 9, particularly, and its rear edge is a sort of fulcrum upon which, and the tail-piece 22, its tension is varied by adjusting the clamp-screw 24. In order to limit the upward movement of this spring I provide a stop-screw 25 adjustable in the lug 4.

Should the cutter meet an obstruction of such character that if the work proceeded it would be apt to be torn, the thrust of the cutter would be thrown upon the adjustable clutch composed of the female and male members 16 and 20, and by the tail-piece 22 of member 20 such thrust would be transmitted to the spring 23 which would immediately move and thus relieve the cutter and obviate the tearing of the work. The extent of relief through the spring 23 is governed by the adjustment of the screw 24. In that class of work where no relief is required, the screw 25 may be turned down upon the spring finger 23, and thus the cutter may be made a positive cutter, without relief. In taking heavy cuts, such as the threading of cast iron, where a rigid tool is required, this facility of rendering the device a positive cutter will be found of great utility. The movement of the spring may be regulated by adjusting the screw 25. By the adjusting and regulating means described the cutter is adapted to a great variety of work.

What I claim is:—

1. A cutting tool, having a tool holder, a circular cutter provided with a journal arranged in said holder, means applied to said journal to permit its rotation thereby to relieve the cutter, and a clamp-screw for regulating the tension of said relief means.

2. A cutting tool, having a tool holder, a circular cutter provided with a journal arranged in said holder, means applied to said journal to permit its rotation thereby to relieve the cutter, a clamp-screw for regulating the tension of said relief means, and a set-screw for throwing said tension device out of operation as desired.

3. A cutting tool, having a tool holder provided with an eye, a cutter, an adjustable journal for said cutter arranged in said eye, a tail-piece on said journal, a plate-spring engaging said tail-piece, and a tension regulating screw for attaching said plate-spring to the tool holder.

4. A cutting tool, having a tool holder provided with an eye, a cutter, an adjustable journal for said cutter arranged in said eye, a tail-piece on said journal, a plate-spring engaging said tail-piece, a tension regulating screw for attaching said plate-spring to the tool holder, and a stop-screw applied to the holder above the spring.

5. A cutting tool, having a tool holder provided with an eye, a transverse groove in said holder, a cutter, a journal for said cutter arranged in the eye and having a tail-piece entering said groove, and a tension spring applied to the holder and engaging the tail-piece.

6. A cutting tool, having a tool holder provided with an eye, a transverse groove in said holder, a cutter, a journal for said cutter arranged in the eye and having a tail-piece entering said groove, a tension spring applied to said holder and engaging the tail-piece, and a stop-screw coöperating with said spring.

7. A cutting tool, having a holder provided with an eye, a cutter, a stud-bolt engaging said cutter, a clutch mounted in the eye upon the shank of the stud-bolt and turning with the stud-bolt, one of the clutch members adjustable upon the stud-bolt with relation to the other, means to unite these parts, and means to control the turning movement of the cutter and clutch within the eye.

8. A cutting tool, having a holder provided with an eye, a cutter, a stud-bolt engaging said cutter, a clutch mounted in the eye upon the shank of the stud-bolt and turning with the stud-bolt, one of the clutch members adjustable upon the stud-bolt with relation to the other, means to unite these parts, and yielding means to control the turning movement of the cutter and clutch within the eye.

9. A cutting tool, having a holder provided with an eye, a cutter having holes in it, a stud-bolt having a head, a shank and pins, said shank and pins engaging the holes in the cutter, an adjustable clutch one member of which is applied in the eye and upon the shank of the stud-bolt and having sockets engaged by the pins of the stud-bolt and another member having a tail-piece and loose upon the stud-bolt shank, means to unite these parts, and a tension device applied to the tail-piece.

10. A cutting tool, having a holder provided with an eye, a cutter having holes in it, a stud-bolt having a head, a shank and pins, said shank and pins engaging the holes in the cutter, an adjustable clutch one member of which is applied in the eye and upon the shank of the stud-bolt and having sockets engaged by the pins of the stud-bolt and another member having a tail-piece and loose upon the stud-bolt shank, means to unite these parts, a tension device applied to the tail-piece, and a stop-screw coöperating with said tension device to limit its action and to put it out of action.

In testimony whereof I have hereunto set my hand this 2d of March, A. D. 1906.

FRED H. CHAPMAN.

Witnesses:
  IDA MURRAY,
  RUTH T. FENNER.